May 17, 1927.
J. G. JACKSON
1,628,885
COVERED BAKING PAN
Filed March 9, 1925
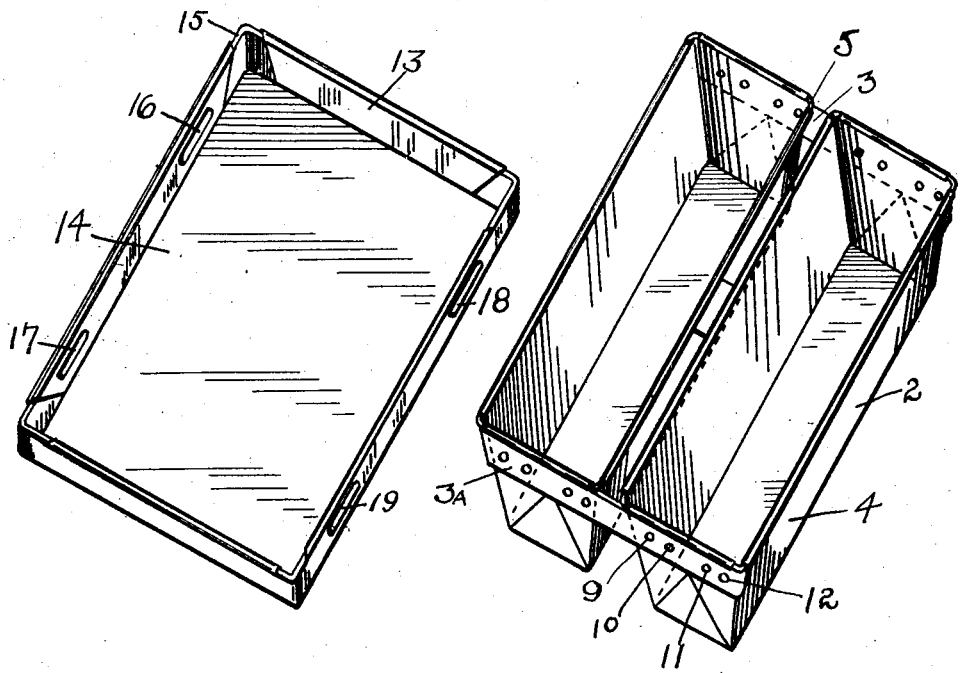
FIGURE II  FIGURE I
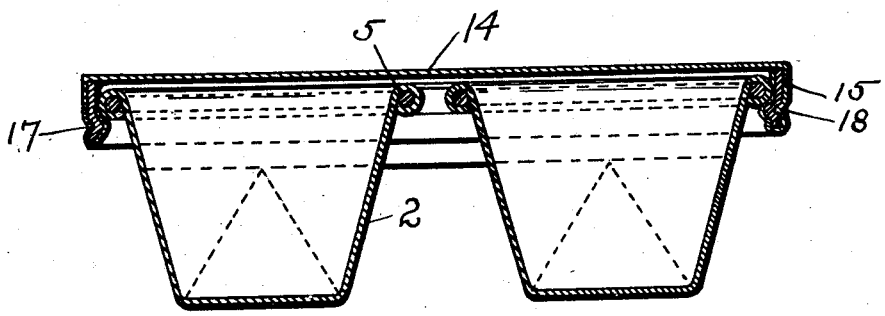
FIGURE III
JOSEPH GEORGE JACKSON,
INVENTOR.
ATTORNEY.

Patented May 17, 1927.

1,628,885

UNITED STATES PATENT OFFICE.

JOSEPH GEORGE JACKSON, OF CHICAGO, ILLINOIS, ASSIGNOR TO EDWARD KATZINGER COMPANY, OF CHICAGO, ILLINOIS.

COVERED BAKING PAN.

Application filed March 9, 1925. Serial No. 14,143.

My invention relates to multiple baking pans such as used in bakeries and the like, where a considerable amount of bread or other product is baked.

One of the objects of this invention is to provide a cover for a multiple group of pans. Another object is to so arrange the pans and cover that the loaf baked in the pan will be substantially flat on all sides, including the top, giving what is known to the trade as the "Pullman" loaf or "sandwich" loaf.

Other objects are to provide a means for readily and easily attaching the cover in such a manner that it will remain in place throughout the baking process. Another object is to provide a strong, rigid construction for pan and cover.

In addition to the above objects, it is desired to make a structure as light as possible, as inexpensive to construct as possible, and as durable as possible, as well as readily attached and removed.

Other objects will be apparent from the disclosures which follow.

In the manufacture of certain kinds of bread it is customary to have the loaf form approximately a parallelopiped, in which the sides are substantially flat and the corners are substantially 90 degrees, although it is of course customary to allow a certain amount of taper or draft for the removal of the loaf from the pan.

In forming such a loaf it is necessary of course to cover the top of the pan, as otherwise the top of the loaf would be curved or arched, as is ordinarily found in uncovered loaves or hearth baked loaves.

In making such a loaf an effort is made to put just sufficient dough into the pan to fill the pan when the dough rises during the baking process. The pan is of course only partly filled with the raw dough prior to baking.

As the bread rises it of course exerts a pressure on the cover of the pan, which pressure, providing the cover remains in place, serves to force the loaf into the corners, forming a square, true loaf of the desired shape. It sometimes happens, due to over-proofing of the dough, the variation in the nature or proportion of the ingredients, or variations in the amount of dough, that considerable pressure is exerted upon the pan cover. In order to counteract this pressure it is therefore desirable to attach the pan cover to the pans in some manner which will resist a considerable amount of pressure. It has been customary to secure this result by making the top very heavy and relying upon the weight of the top to hold the cover in place. This method is open to numerous objections, such as the high cost of the cover, the rapid deterioration of the pans and cover, the effort in handling the extra weight, and the effect of a heavy cover in withdrawing heat from the bread and from the oven, thus affecting the quality of the loaf and increasing the fuel consumption. Further, a heavy cover can only exert an amount of pressure equal to its own weight, which sometimes is not sufficient.

My invention is designed to overcome the difficulties mentioned above and secure the objects previously enumerated and those outlined below.

One form of my invention is shown in the accompanying drawing, which forms a part of this specification, and in which Figure I shows a perspective view of a series of two pans, while Figure II shows in perspective a cover adapted to cooperate with the pan in accordance with my invention.

Figure III shows a sectional view of the pans and cover in place.

I have shown in the drawing a multiple pan set made up of two individual pans, but it will be apparent that any number of pans may be included in the set by changing the size of the frame and the cover to suit the required number of pans. It will also be apparent that the sizes and shapes of the pans may be varied and the frame made to fit the desired pans.

Referring more specifically to the drawing, I have shown the pans (2) held together by straps (3), the pans being made in the conventional method by folding a sheet of tin plate (4) and rolling the upper edges around a heavy wire frame (5).

The ends of the pans are folded in and held by rivet (6), while a pair of straps (3A and 3) extend along the short edges of the pans and are riveted to the pans by rivets (9, 10, 11 and 12).

The cover (13) is made from a sheet of heavy metal (14) formed by bending over and around a rectangular strap (15). Depressions (16, 17, 18 and 19) are formed inwardly through the heavy metal (14) and strap (15), forming bosses arranged to resiliently engage with the rim of the pan at the point that the top edge of the pan is bent over the wire reinforcing frame.

In the construction described above there is sufficient resilience in the top edge of the pan and the bosses and sides of the cover, to permit the cover to be forced downward over the pans. This is effected further by the shape of the boss shown in cross section in Figure III, where it will be noted that the under side is tapered, thus making engagement relatively easy.

The amount of force required to engage the cover with the pan can of course be readily controlled by the depth of the boss in the cover, as well as the stiffness of the structure employed. In practice it is desirable to so design the pan that a reasonable pressure with the hand or a slight blow with the hand will force the cover into position and it will remain firmly in position and resist the normal upper pressure of the loaf to displace it. On the other hand, the cover must be so arranged that it may be readily removed after the pans are taken from the oven.

Such a cover is light, easily manipulated, effective in making a square, uniform loaf of bread, as well as strong and durable.

It will be obvious that this structure may be modified in many ways without departing from the spirit of the invention. Thus any number of pans may be included in a set and substantially the same results obtained. The details of construction of the pans and cover may be modified in obvious details, and the resilient bosses may be formed by riveting strips onto the cover or pans, or it may be engaged with straps or other parts of the pans, if desired.

Having now fully disclosed my invention, what I claim as new and wish to secure by Letters Patent in the United States is as follows:

A multiple of pans attached together to form a unit, a reinforced lip extending outwardly around the upper edges of said pans, said lip being capable of lateral resilient movement, a cover for said unit, a rigid strap member reinforced and enveloped by the extended edges of said cover, and bosses on said cover reinforced by said strap member and arranged to engage with said lip.

JOSEPH GEORGE JACKSON.